3,674,433
MODIFICATION OF FEEDSTOCK OIL WITH
RUBBER IN CARBON BLACK PROCESS
Glenn O. Wyatt, Collinston, La., assignor to Cities
Service Company, New York, N.Y.
No Drawing. Filed Sept. 21, 1970, Ser. No. 74,143
Int. Cl. C09c *1/48, 1/50*
U.S. Cl. 23—209.4                 7 Claims

ABSTRACT OF THE DISCLOSURE

Old tire rubber is digested in a carbon black feedstock oil. The resulting modified oil is then thermally decomposed to produce carbon black which is recovered and incorporated into end-use products, e.g. new automobile tires. Disposal of old tires is thus accomplished without pollution of the atmosphere. The amount of rubber digested in the oil is in excess of about 10 weight percent and can range up to about 30 weight percent. The resulting modified feedstock oil can be effectively utilized to make carbon black while employing conventional pumping, metering, spraying and thermal decomposition means.

BACKGROUND OF THE INVENTION

This invention relates to disposal of scrap rubber, e.g. worn-out vehicle tires, and more particularly pertains to a method for digesting tire rubber in a carbon black feedstock oil for subsequent conversion of the rubber into carbon black by thermal decomposition of the resulting modified oil.

Disposing of scrap rubber tires has become a major problem since the conventional method of disposal is to burn the rubber in the open air, an indiscriminate practice which liberates huge quantities of waste carbon and other pollutants into the atmosphere. The problem is best appreciated by realization of the fact that something like 250,000,000 worn-out automobile tires must be disposed of each year, a large portion of which are now burned.

In the U.S. patent application, Ser. No. 884,037, filed Dec. 10, 1969, and assigned to the same assignee as this application, a process is disclosed for disposing of waste rubber by dissolving it in a carbon black feedstock oil and whereby the resulting rubber-modified oil is thermally decomposed into utilizable carbon black by otherwise conventional means. For instance, the feedstock oil is sprayed into hot combustion gases in a furnace and is thereby transformed into carbon black which is separated and collected as a marketable product. While the aforementioned process is fully operable and utilizable, difficulty has nonetheless been encountered when digesting old tire rubber in a carbon black feedstock oil at concentrations in excess of about 10 weight percent, since the viscosity of the resulting modified oil becomes so great as to render it unpumpable and/or unatomizable in the carbon black manufacturing process. A need has been felt for increasing the amount of rubber that can be dissolved in the oil since the disposal rate of old rubber can be increased thereby while improving the economics of the process at the same time.

SUMMARY OF THE INVENTION

It is therefore an object of the present invention to increase the rate at which scrap rubber tires can be disposed of without pollution of the atmosphere. It is also an object of this invention to increase the amount of tire rubber that can be digested in a carbon black feedstock oil.

Another object of the present invention is to convert scrap vehicle tires into carbon black. Still another object of this invention is to increase the rate at which old rubber tires can be converted to carbon black.

In the present invention, tire rubber in particulate form is mixed with a carbon black feedstock oil using a weight proportion of rubber to oil in excess of about 1/9 so that the amount of rubber in the mixture is, therefore, in excess of about 10%. The resulting mixture is then agitated under heat for digestion of the rubber in the oil while maintaining the mixture at a condition which substantially preserves the content of one or more fractions of the oil that would normally be vaporized and lost from the mixture at the temperature being employed for the digestion. The mixture is also maintained out of any substantial contact with air or other strong oxidants during the digestion in order to prevent premature oxidation of the constituents. Accordingly, the amount of tire rubber which can be dissolved in feedstock oil to provide a liquid stream that is readily pumpable and atomizable can be be increased to substantially in excess of 10 weight percent, e.g. 15–30 weight percent.

Any suitable carbon black feedstock oil can be employed for digesting the tire rubber. Generally, these oils are highly aromatic and have a BMCI (Bureau of Mines Correlation Index) of between about 90 to about 160, and more preferably between about 115 to about 135.

DETAILED DESCRIPTION OF THE INVENTION

In order to particulate the tire rubber, the steel beads are first removed from the old tires. The corded rubber is then shredded by any suitable means, a variety of which are well known in the art. Most of the cord can be separated from the rubber and disposed of, but any that is carried over into the feedstock oil becomes melted or charred during the digestion process and thus becomes incorporated into the modified feedstock as discrete particles which do not adversely affect pumping or spraying operations. Where preferred, the mixture can be strained during or after digestion to remove particles of debris which would hinder the process.

As previously indicated, the particulated rubber is mixed with the oil at a weight ratio whereby the proportion of rubber is in excess of about 1/9, i.e. in excess at about 10 weight percent, and preferably about 15 to about 30 weight percent. Since the viscosity of the resulting modified oil will increase in proportion to the amount of rubber that is incorporated into it, the actual proportion of rubber that can be digested in the oil is limited by this factor. Preferably, the viscosity of the modified feedstock oil should not exceed about 300–400 SSU at the time of spraying into a furnace for the purpose of thermally decomposing the oil into carbon black. More preferably, the oil should be at a viscosity of about 200 SSU or less at the time of spraying. The modified feedstock oil can be preheated, prior to spraying, at temperatures up to about 700° F. to achieve a desired viscosity. Care must be exercised, however, to prevent coking of the modified oil during such heating, i.e. temperature and pressure should be regulated to prevent premature vaporization, thermal decomposition or oxidation of the constituents in the mixture.

The mixture of particulated tire rubber and oil is agitated under heat to achieve digestion of the rubber. The terms "digestion" and "digested" as used herein are intended to mean at least partial dissolution of the rubber of the tire-rubber compound, and dispersion and suspension in the oil of any undissolved components of the tire-rubber compound. Thus, insoluble materials which are a part of the tire became part of the modified feedstock oil, e.g. carbon black and other reinforcing or non-reinforcing rubber fillers, small amounts of zinc oxide and titanium dioxide, and insoluble fractions of the rubber such as carbon rubber gel. It is therefore desirable to employ a high degree of agitation which achieves discrete particulation and thorough dispersion of these insoluble materials in the oil. Although a variety of methods can be employed, a rotary gear pump can be used to advantage whereby the mixture is circulated to and through the pump, since both agitation of the mixture and mastication of the tire rubber can be accomplished with this device. Otherwise, conventional apparatus and techniques can be employed for containing and heating the mixture.

During digestion of the tire rubber within the oil, conditions should be established which preserve the content of that part of the oil which is normally vaporized at the temperature to which the mixture is heated during the digestion step. This can be accomplished by heating the mixture under pressure in a closed vessel whereby vaporization of such volatile fractions of the oil is substantially prevented. Otherwise, these vaporized fractions can be condensed and returned to the mixture at about the same rate that the vapor is formed, i.e. reflux. A combination of elevated pressure and reflux can also be employed.

Any suitable carbon black feedstock oil can be employed in the practice of the invention, the general nature of which is well known to those skilled in the art of making carbon black. They can be either a petroleum residue or coal tar oil having a mean molecular weight in excess of about 100 and an aromaticity of at least about 50%. Preferably the molecular weight will range from about 200 to about 350 and the aromaticity will be within the range of from about 70% to about 95%. Accordingly, the BMCI of these oils will range from about 90 to about 160 and more preferably will be within the range of about 115 to about 135. Being a mixture of distillable fractions having different boiling points, they are characterized by a mean boiling point within the range of about 550° F. to about 800° F., and an initial boiling point within the range of about 450° F. to about 625° F.

During digestion of the tire rubber in the oil, the mixture should also be maintained out of contact with the air or other oxidizing agents whereby the constituents of the mixture become excessively oxidized prior to conversion of the modified oil to carbon black. While not wishing to be bound by theory, it is felt that production of a feedstock oil with a high content of rubber—but without prohibitive increase in the viscosity of the oil—is made possible by preserving the content of readily vaporizable fractions of the oil and by preventing oxidation of the constituents of the mixture. Both of these ends can be accomplished by carrying out the digestion in a closed vessel or within a vented vessel having refluxing means and whereby substantial contact of the heated mixture with air during agitation is to a large extent precluded.

The temperature to which the mixture is heated to effect digestion of the rubber should be as high as possible in order to promote the digestion, but should not be so great as to result in charring or coking of the mixture. The maximum temperature is, therefore, subject to considerable variation depending, among other things, upon the type of oil employed and the proportion of tire rubber to oil in the mixture. Generally, the digestion temperature should never exceed about 700° F. while being at least about 350° F. Temperature within the range of about 450° F.–600° F. can usually be employed to best advantage. Digestion time depends upon the type of oil employed, the digestion temperature and the proportion of rubber in the oil. Usually, the digestion can be accomplished within from about one to about eight hours.

After completion of the digestion process, the modified feedstock can be strained to remove undesirable particulate material which might hinder pumping, metering and spraying of the oil. The modified feedstock can then be sprayed into a furnace for production of carbon black in a conventional manner, and it will be appreciated that the present invention is not limited to a particualr type of carbon black furnace or process nor to a particular type of carbon black product.

EXAMPLE

After removal of the steel beads, a nondescript variety of worn-out automobile tires were shredded into pieces about ⅜ inch long by ¼ inch wide. Much of the tire cord was stripped loose from the rubber during the shredding operation and was separated from the rubber particles by blowing with air.

An attempt was made to produce a modified carbon black feedstock oil by digesting 558 pounds of the shredded tire rubber in 250 gallons of an aromatic carbon black feedstock oil having the properties shown in Table I.

TABLE I

Unmodified feedstock oil

| | |
|---|---|
| API gravity | 0.2 |
| Viscosity: | |
| SSU at 130° F. | 594.0 |
| SSU at 210° F. | 67.0 |
| Molecular weight | 295.0 |
| BMCI | 123.0 |
| Index of refraction | 1.648 |
| Weight percent sulfur | 1.060 |
| Weight percent ash | 0.003 |
| Weight percent benzene insolubles | 0.039 |
| Weight percent asphaltenes | 0.500 |
| UOP K factor | 10.0 |
| Mean boiling point, ° F. | 790.0 |
| Specific gravity | 1.0744 |
| Pounds/gallons | 8.949 |

Digestion of the tire rubber was achieved by circulating the mixture at 500° F. through a rotary gear pump, which pulled the mixture from the bottom of a 500 gallon heated tank and then pumped the mixture back into the top of the tank. The tank was open to the atmosphere and was not provided with any means for refluxing vaporized fractions of the oil. After twelve hours the rubber appeared to be thoroughly digested in the oil, i.e. no macroparticles of rubber were visible. The viscosity of this modified feedstock oil is shown in Table II. It was too viscous for satisfactory pumping, metering and spraying in the manufacture of carbon black.

TABLE II

| Temperature, ° F.: | Viscosity, cps. |
|---|---|
| 270 | 4020 |
| 300 | 1660 |
| 340 | 960 |
| 380 | 570 |
| 410 | 330 |
| 450 | 290 |
| 455 | 260 |
| 475 | 235 |
| 490 | 230 |

The experiment was repeated after sealing the tank and after installing a water jacket, for the purpose of reflux, which cooled the top of the tank and the upper portion of the wall thereof. Accordingly, the interior of the tank was closed off to the atmosphere, and oil vapors were condensed and returned to the mixture at about the same rate that they were formed. The same amounts, types and proportion of rubber and oil were employed as in the first experiment, and the mixture was again heated and agitated by means of the gear pump as previously described. Agitation of the mixture under heat was carried out for eight hours, after which the digestion of the rubber was adjudged to be complete. Operating pressure in the tank during the digestion procedure was about three to four p.s.i.g.

The viscosity of the resulting modified feedstock oil is shown in Table III.

TABLE III

| Temperature, °F.: | Viscosity, cps. |
|---|---|
| 160 | 7600 |
| 178 | 3800 |
| 208 | 680 |
| 216 | 560 |
| 260 | 150 |
| 342 | 50 |
| 432 | 80 |

Saybolt Universal viscosity was determined to be 560 SSU at 210° F. and 277 SSU at 250° F. This modified oil was therefore found to be satisfactory for pumping, metering and spraying as a carbon black feedstock oil.

While the invention has been described with reference to particular materials, proportions, conditions, apparatus and the like, it will be understood that other embodiments will become apparent which are within the spirit and scope of the invention described in the appended claims.

Therefore, what is claimed is:

1. In a process for disposing of rubber tires wherein the tire rubber is digested in a carbon black feedstock oil and the resulting modified oil is then thermally decomposed to produce carbon black, the improvement which comprises:
   (a) mixing said tire rubber in particulate form with a carbon black feedstock oil having a BMCI of from about 90–160, the proportion of rubber to oil in the resulting mixture being in excess of (about) 1/9;
   (b) agitating the mixture at a temperature within the range of about 350° F. to about 700° F.; for digestion of the tire rubber, said digestion being carried out at a condition which:
      (1) substantially preserves the content of a vaporizable fraction of said oil that is normally vaporized at the temperature at which the mixture is being heated and which
      (2) also precludes any substantial oxidation of the mixture during digestion, and
   (c) recovering a modified feedstock oil having tire rubber digested therein and which is pumpable and atomizable in a furnace carbon black process.

2. The process of claim 1 in which the said feedstock oil is characterized, prior to modification, by a BMCI within the range of about 115 to about 135.

3. The process of claim 1 in which the digestion is carried out at a temperature within the range of about 450° F. to about 600° F.

4. The process of claim 1 in which the digestion is carried out at superatmospheric pressure in a closed vessel.

5. The process of claim 1 wherein the digestion is carried out in a vessel which is vented to the atmosphere but wherein material that is volatilized from the mixture is continuously refluxed and is returned to the mixture.

6. The process of claim 1 in which the resulting modified feedstock oil is sprayed into a furnace and is thermally decomposed therein to form carbon black, and the viscosity of the modified feedstock oil does not exceed about 400 SSU when sprayed into the furnace.

7. The process of claim 6 wherein the viscosity of the oil is about 200 SSU or less when sprayed.

References Cited
UNITED STATES PATENTS

| 3,048,218 | 8/1962 | Gunther | 260—2.3 X |
| 3,073,681 | 1/1963 | Ceresna | 23—209.4 |
| 3,244,484 | 4/1966 | Johnson | 23—209.4 |
| 3,240,565 | 3/1966 | Krejci et al. | 23—209.4 |

EDWARD J. MEROS, Primary Examiner

U.S. Cl. X.R.

23—209.6; 260—2.3